United States Patent Office 3,756,804
Patented Sept. 4, 1973

3,756,804
PROCESS FOR RECLAMATION OF FLUE DUST
Calvin Leo Stevenson, Denver Colo., assignor to
Deltech, Inc., Denver, Colo.
Continuation of abandoned application Ser. No. 865,569,
Oct. 13, 1969. This application Feb. 16, 1972, Ser. No.
226,930
Int. Cl. C21b 3/04; C22b 7/02
U.S. Cl. 75—25                                    10 Claims

ABSTRACT OF THE DISCLOSURE

A method for the treatment of flue dust from iron making furnaces to recover minor constituents therefrom which are volatile at high temperature and to reduce the iron components in the dust to a state where they can be re-cycled to the furnace or otherwise used. The method consists essentially in preheating the flue dust to a temperature approaching 1700 degrees F. Thereafter, the flue dust particles are passed into a reducing, essentially oxygen-free, atmosphere where the temperature is increased to as high as 2200 degrees F. A portion of this reducing atmosphere is continuously diverted and cooled to condense the metallic volatiles, primarily zinc. Thereafter, the remaining components of the dust are cooled and released, at a temperature less than 700 degrees F., to recover the iron without reoxidation when it is exposed to the atmosphere.

---

This application is a continuation of my application filed Oct. 13, 1969, Ser. No. 865,569 now abandoned to include subject matter disclosed but not claimed therein.

The present invention relates to the recovery of valuable constituents from waste materials and more particularly to the treatment of reject fines, commonly referred to as flue dust, from steel making furnaces to separate metallic components in these fines and condition them for subsequent conventional treatments.

One of the waste materials from any of several different types of steel making furnaces will include the fines which are ordinarily rejected as flue dust. These fines, which will be hereinafter referred to as flue dust, must be collected in some manner and then disposed of. The small size of the particles, which may be difficult to wet, makes the flue dust unsuitable for even simple uses such as ballast or earth fill, and the flue dust may be chemically active to the point where it becomes a pollutant. Therefore, its disposal often becomes a serious problem.

Such flue dust will include as its major constituents, oxides of iron, carbon and sometimes limestone particles. The flue dust will also contain appreciable amounts of zinc, lead and sometimes sulphur. It will also contain smaller amounts of other constituents including phosphorous, silicon, alumina and titanium.

The present invention was conceived and developed with the foregoing and other considerations in view, with a primary object of the invention being to provide a novel and improved method for the treatment of flue dust to recover valuable constituents therein, to convert the iron therein into a useful form, to recycle carbon particles through a furnace and to render the remaining tailings a wettable material suitable for disposal.

Another object of the invention is to provide a novel and improved method for the treatment of the flue dust which is adapted to reclaim selected, valuable constituents within the flue dust and render the operation economically worthwhile.

Another object of the invention is to provide a novel and improved method for the treatment of flue dust which is especially adapted to reduce and collect the volatile metals, such as zinc and lead, which are usually present in flue dust.

Another object of the invention is to provide in an improved treatment of flue dust to reduce and collect the normally volatile metal constituents, an operation which at the same time will condition the iron particles of the flue dust to a state suitable for collection, for return to a steel making furnace or for utilization as powdered iron.

Another object of the invention is to provide a novel and improved method for the treatment of flue dust to condition and recover the metallic components therein, which utilizes the carbon particles in the flue dust.

Another object of the invention is to provide a novel and improved method for the treatment of flue dust which may be easily modified in minor respects to be applied to flue dust from different localities having varying chemical compositions.

Another object of the invention is to provide a novel and improved method for the treatment of flue dust to recover mineral constituents therein, to combust the carbon particles therein and to generally neutralize any acidic components to render the residuum a substantially inert material which will not act as a pollutant.

Another object of the invention is to provide a novel and improved method for the treatment of flue dust to condition the iron particles, to a high-value reduced state essentially free of zinc, and suitable for collection, agglomeration and return to steel making furnaces such as a basic oxygen furnace or an electric furnace.

Other objects of the invention are to provide a novel and improved method for the treatment of flue dust which may be accomplished by simple, easily controlled steps with conventional, easily obtained equipment and at a moderate cost.

The foregoing and other objects will become apparent in the description and exemplifications of the invention as hereinafter set forth and defined in the appended claims. In the accompanying drawing:

Figure 1:
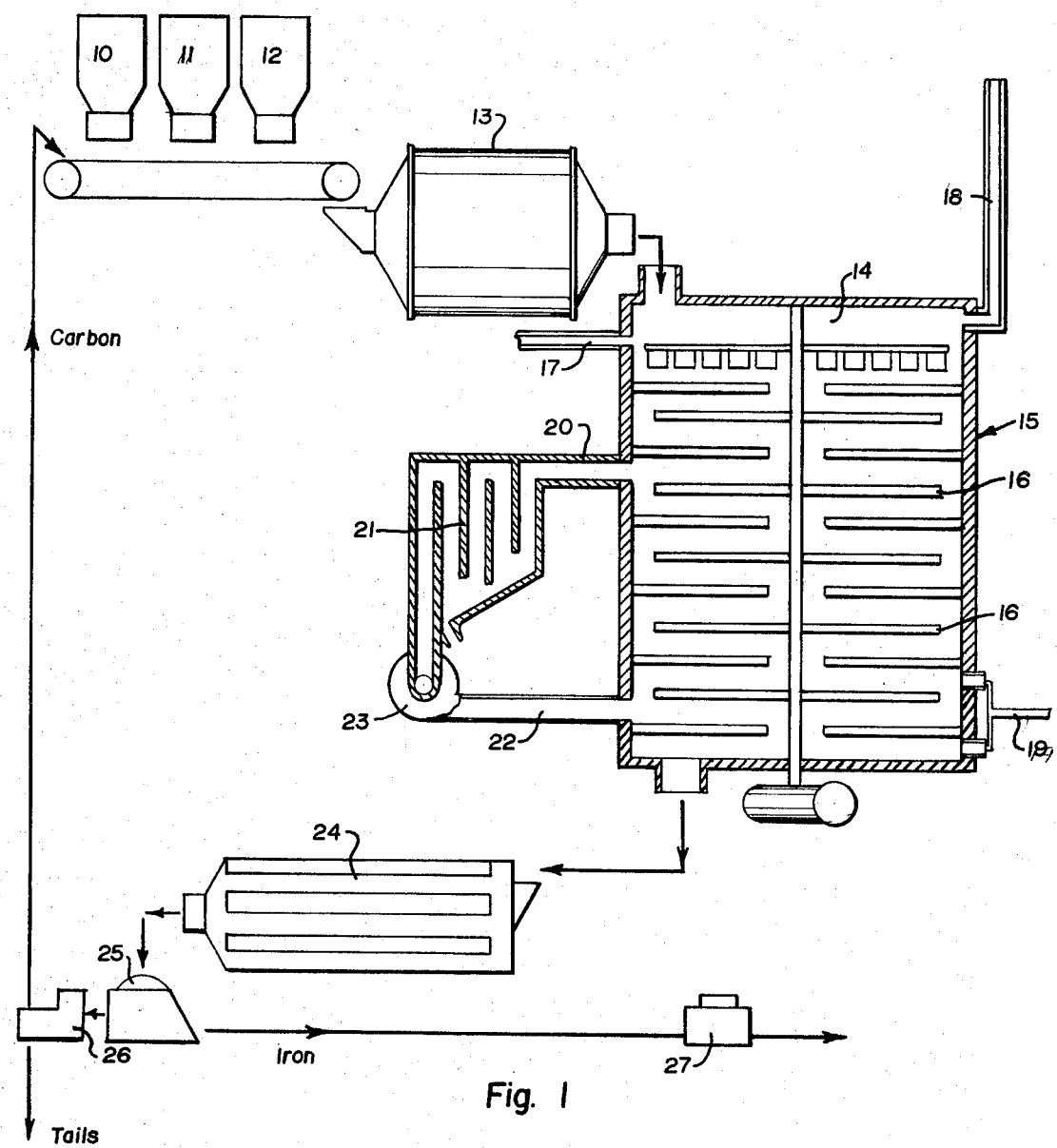
FIG. 1 is a flow diagram representative of the process, using a rabbled hearth type furnace for the treatment of flue dust.

Various types of furnaces are presently used for the manufacture of steel including blast furnaces, furnaces using a basic oxygen process and open hearth furnaces. Regardless of the type, there is a substantial amount of flue dust discharged from a furnace when it is in operation and although the constituents or flue dust will vary in each type of furnace and from one location to another, the basic components of the flue dust are similar and the ranges of proportions of components set forth in the following lists are typical of the components generally found in the flue dust of steel making furnaces. These lists show flue dust components as exemplified from analyses of dusts from furnaces of the C. F. & I. Steel Corp. at Pueblo, Colorado.

VARIATIONS OF FLUE DUST COMPONENTS IN PERCENT

|                     | Blast furnace | Basic oxygen furnace |
|---------------------|---------------|----------------------|
| Carbon              | 8–14          |                      |
| Iron                | 28–40         | 53–63                |
| Zinc                | 1.0–8.0       | 0.5–8.0              |
| Lead                | 0.1–0.8       | 0.1–0.2              |
| Sulphur             | 0.1–0.4       | 0.06–0.18            |
| Silicon ($SiO_2$)   | 6–12          | 1–2                  |
| Phosphorus          | 0.08–0.16     | 0.2–0.28             |
| Titanium ($TiO_2$)  | 0.05–0.25     | 0.05–0.15            |
| Alumina ($Al_2O_3$) | 2–4           | 0.3–0.8              |
| Magnesium (MgO)     | 1.5–5         | 1–4                  |
| Calcium (CaO)       | 7–12          | 4–6                  |

The metals, in some oxidized form common to all processes and with which the invention is concerned, include iron, zinc and lead. Accordingly, the basic process constituting the present invention provides for the treatment of a flue dust having these metal oxides in some proportion and they will be called the primary components. This basic process is easily modified to provide treatment for flue dust having sulphur, as will be hereinafter set forth.

The flue dust from a furnace will ordinarily consist of very fine particles, however flue dust from a blast furnace will also include particles of a substantial size. Accordingly, the first step in the treatment of flue dust will include, when necessary, a grinding operation to comminute the particles to a selected size, and preferably, to a size which will pass through a 35 mesh screen.

The process includes a further preparatory step consisting of the addition of a controlled amount of carbon, if necessary to supplement the amount of carbon in the flue dust and to provide a stoichiometric relationship between the carbon and the other metal oxides, the primary components in the blend. This carbon may be coke fines, ground coke or ground coal. A typical analysis of these components is as follows:

|  | Percent | | |
| --- | --- | --- | --- |
|  | Coke fines | Ground coke | Ground coal |
| Carbon | 82.8 | 83.4 | 52.8 |
| Sulphur | 0.75 | 0.75 | 0.45 |
| Water | 7.1 | 4.9 | 10.7 |
| Volatiles | 3.8 | 3.2 | 38.9 |
| Ash | 13.4 | 13.4 | 8.3 |

This additional carbon is either blended into the flue dust during the grinding operation or thereafter. Further preparation of the flue dust for furnace treatment may include pelletizing or briquetting the flue dust into small pellets to facilitate handling the material in a furnace selected for the operation. This pelletizing may be accomplished in any conventional manner. Sulphur is an undesirable impurity which is found in the flue dusts and also in the carbon additive as shown above. If it is found necessary to reduce the sulphur content, the same can be accomplished with limestone particles added to the blend, and the combination of the sulphur with limestone produces calcium sulphide waste particles. It is to be noted that in the present process, using a reducing atmosphere, undesirable gaseous sulphur dioxide and trioxide are not formed in the furnace.

The prepared blend, whether in the form of small pellets or dust, is next conveyed to a furnace where the mass is heated to above 1700 degrees F., preferably in the range between 1900 degrees F. and 2200 degrees F., and in a reducing atmosphere deficient in oxygen and thus, essentially oxygen-free. This heating is continued for a selected time period to effect reduction reactions of the metallic components of the flue dust-carbon blend. The basic reactions to reduce the metals either to a metallic state or to a lower oxide includes the following:

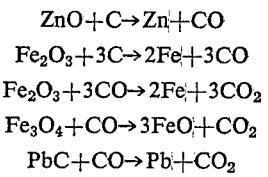

The extent with which these reactions will progress will naturally depend upon the temperature in the furnace and the proportions of carbon to the primary components and the various reactions are well known to the art. Ordinarily, a time period of 30 minutes to one hour will be required to reduce the zinc and lead oxide within the dust. Simultaneously, with this reduction occurring at a temperature in excess of 1700 degrees, the lead and zinc will be volatilized. The metallic gases generated by this reduction and other gases generated within the furnace are then conducted in a circuitous path, away from the furnace, through a condensor and then back to the furnace. The temperature drop within the condensor is controlled to cause a substantial portion of the lead and zinc to precipitate and remain in the condensor until it may be collected for further treatment, in any suitable manner. The gas returning to the furnace from the condensor will be primarily carbon monoxide and carbon dioxide with a small amount of zinc and lead vapor. This gas is reheated to again move through the furnace and the gas will ultimately be discharged from the furnace as a waste material, preferably after the carbon monoxide is burnt to form carbon dioxide to recover the heat content therefrom.

In order to effect the reduction and vaporization of the zinc and lead within the furnace, circulate the same through the condensor and return the gases to the furnace for reheating and for ultimate disposal, it was preferred to move the flue dust-carbon blend through an elongated furnace along a path which is counter-current to the flow of gas from the furnace and with the diversion of gas to the condensor being at an intermediate location within the furnace circuit.

Referring more particularly to FIG. 1, holding bins 10, 11 and 12 will be used to store the materials, including flue dust, needed for the operation. These materials will be conveniently proportioned and conveyed to a grinder 13 where grinding and blending will occur. As the blend moves from the grinder, it is conveyed to an upper preheater section 14 of a furnace 15 where carbon monoxide gas is burnt and reheated before being discharged from the furnace.

The furnace 15 is a zoned type through which a flow of flue dust may move as from the top to the bottom of the furnace and a counter current flow of gases may move in the opposite direction. A furnace known as a rabbled hearth type is suitable for this purpose. The furnace 15 is built in the general form of a tower with hearth sections 16 forming a sequence of levels and the flue dust moving through this furnace will move from one level to the next commencing from the top and moving to the bottom of the furnace where it is discharged. In this furnace, the upper section is used for preheating operations and an air supply line 17 is directed into the furnace at this upper section to combust the carbon monoxide before the gas is discharged as through a stack 18. It is to be noted that the temperature of the gas in this upper section of the furnace is lowered as the flue dust is heated and also, that any metal vapors of zinc or lead in the gases being discharged from the stack 18 will be condensed upon the cooler flue dust particles entering the furnace. The lower levels in the furnace will be progressively at a higher temperature so that the carbon component of the flue dust blend, converted to carbon monoxide, may react with metallic oxides to effect the desired reduction actions. The furnace is fired and heated by a burner 19 near the bottom of these levels which is set to burn in and to create a reducing atmosphere which is deficient in oxygen, although some oxygen will be supplied to this furnace, as at the burners, to burn a substantial portion of the carbon particles in the flue dust to carbon monoxide.

A bypass 20 in one side of the furnace, near the top of the intermediate sections, is arranged to pull gas and metal vapors through it and into a condenser 21 where the temperature of this gas is lowered sufficiently to cause the metals to condense and be deposited upon plates within this condensor. The gas, substantially barren of the metallic vapors, is then moved through a line 22 as by a blower 23 to return to the base of the furnace and to be reheated by the burners 19 near the bottom of the furnace. This reheated gas and other gases move thence upwardly through the furnace to continue to reduce and strip the volatile metals from the flue dust particles to permit a continuous recirculation of some of the gas in the furnace through the condensor and a continuous movement of the remainder of the gas upwardly therefrom to the preheating section 14 and thence to discharge. As heretofore noted, the metallic vapors in this portion of the gas which is being discharged are deposited upon fresh flue dust as the gas is cooled in the preheating section, and accordingly are returned to the lower sections of the furnace to eventually be directed into the condensor 21.

As the non-volatile metals and other particles forming the flue dust, which are not consumed or vaporized, are moved from the top to the bottom of the furnace, the iron constituents are changed from oxides to metallic iron or lower oxides which are responsive to magnetic action and thus may be separated from other particles remaining in the flue dust. However, as a prior step, these non-volatile particles are moved through a cooling section 24 which may be a conventional tube cooler or the like. The heat of these particles may be recovered in this section and used for preheating the gas at the furnace burner or for other purposes as needed.

The movement of the particles from the tube cooler 24 is at a temperature sufficiently low, and less than 700 degrees F., to prevent reoxidation of the iron. This permits separation of the reduced iron from the remaining non-magnetic particles. This separation operation is indicated at FIG. 1 as simply moving the material over a magnetic separator 25. However, the separation may also include a flotation cell 26 to separate further, the remaining non-magnetic particles. However, the use of a flotation cell will depend to a great extent upon the nature of the remaining non-magnetic particles. These particles will include carbon and lime. They may also include certain non-metallic sulphides and particles of silicon. The froth flotation will naturally separate the hydrophobic carbon particles from the remaining particles. The carbon particles may be recycled by returning them to the grinder, as in the manner indicated, and the remainder will constitute the tails which will be disposed of. To complete the operation, the iron particles may be used as such or they may be agglomerated, as by briquetting in a suitable apparatus indicated at 27. Thereafter, the particles may be used in the main steel making furnace or used for other commercial purposes.

It is to be noted that while the reducing of the iron oxides to iron may not in and of itself be sufficiently valuable to support the process, it does lend value to the process and when combined with the zinc and lead recovery operations, the entire method becomes quite profitable and is fully justified and especially so, since the much reduced quantity of flue dust particles discarded after the process has been completed can be easily disposed of.

Figure 2:
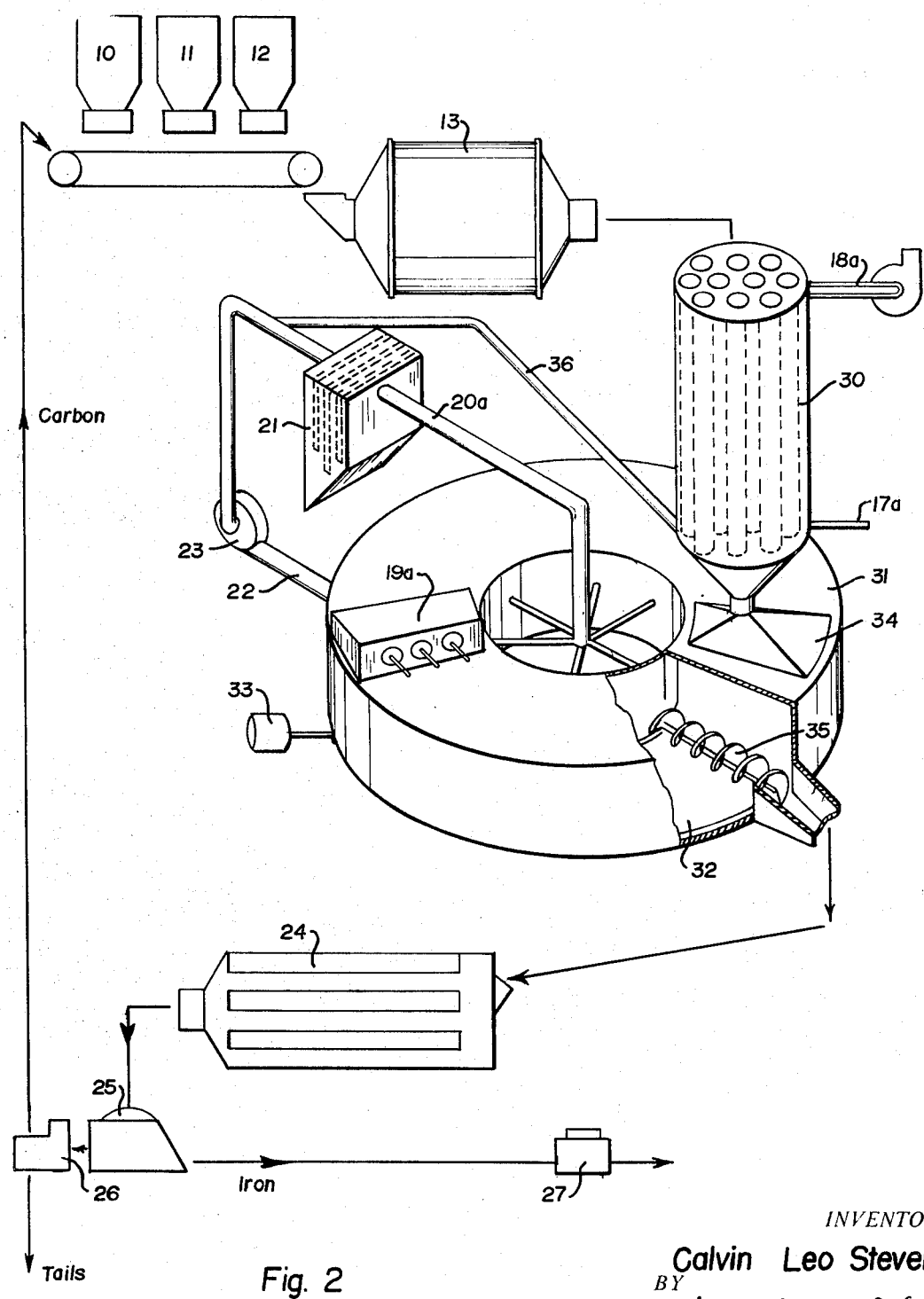
FIG. 2 is another flow diagram representative of the process using a circular type furnace for the treatment of flue dust.

The apparatus depicted at FIG. 2 is similar to that shown at FIG. 1 excepting that a rotary furnace is used. The flue dust, the raw material used in the process, and other necessary ingredients are stored in holding bins 10, 11 and 12 and they are conveniently proportioned and conveyed to a grinder 13, the same as heretofore described. The blend from the grinder is conveyed to a preheater 30 which utilizes gas discharged from the rotary furnace 31. This preheater will also include an air supply line 17a to combust carbon monoxide gases in the preheater section. The preheater 30 functions the same as the upper section of the zoned furnace 13 heretofore described and the temperature of this preheater is such that any metal vapors of zinc or lead in the gases being discharged through the preheater and from the stack 18a will be condensed upon the cooler flue dust as those particles enter the rotary furnace.

The particles entering the rotary furnace are conveyed about the furnace upon a movable floor 32 operated by a suitable drive 33 adjacent to the furnace from the intake section 34 and to a discharge flight 35. Suitable burners 19a are provided above this furnace to maintain a desirable high temperature and to create an atmosphere having a deficiency of oxygen.

A bypass 20a is provided at the center of this furnace and is arranged to pull gas and metal vapors through it and into a condensor 21 where the temperature of the gas is lowered to cause metals to condense and be deposited upon plates within the condensor. The gas, substantially barren of metal vapors, is then moved through a line 22 as by a blower 23 to return to the furnace as heretofore described. Also, an auxiliary line 36 connecting with the return line 22 extends to the base of the preheater 30 to direct a portion of the vapor-barren gas into the preheater. Accordingly, any suitable balance of flow may be attained between the return line 22 and bypass 36.

The non-volatile metals and other particles forming the flue dust which are not consumed or vaporized, are moved about the furnace. The iron constituents are changed from oxides to metallic iron or lower oxides which respond to magnetic action. These particles pass through a cooling section 24 to lower their temperature so that they may be exposed to the atmosphere without the danger of reoxidation. The magnetic particles are then separated from the non-magnetic particles by a magnetic separator 25 and the non-magnetic particles may then be further separated in a flotation cell 26 to recycle carbon particles and to permit the remaining particles to be disposed of as tails as heretofore described. The iron particles may be used commercially as such or agglomerated or briquetted as in apparatus 27.

The following example of the process was carried out in a pilot plant with the results being obtained by careful assays in a conventional manner. To cool the reduced particles, however, an argon atmosphere was provided. This was to expedite the pilot plant operation and it is to be understood that in a continuous prototype operation, a conventional type of cooler 24, such as the tube cooler heretofore described, will be used.

The pilot plant operation used both flue dusts from a basic oxygen furnace and from a blast furnace, a typical assay of the flue dusts used being as follows:

|  | Flue dust from— | |
| --- | --- | --- |
| Components | Basic oxygen furnace | Blast furnace |
| Iron | 57.8 | 33.8 |
| Manganese | 1.36 | 0.28 |
| Silica (SiO$_2$) | 1.30 | 8.8 |
| Alumina (Al$_2$O$_3$) | 0.60 | 2.5 |
| Phosphorous | 0.22 | 0.112 |
| Sulphur | 0.085 | 0.39 |
| Calcium (CaO) | 4.5 | 8.4 |
| Magnesium (MgO) | 3.4 | 4.8 |
| Zinc | 0.15 | 0.15 |
| Carbon |  | 12.7 |
| Ign loss | 0.4 | 6.5 |

EXAMPLE I 397 parts, by weight, of flue dust from a basic oxygen furnace was mixed with 795 parts of flue dust from a blast furnace. 78 parts of coke fines having an assay as heretofore set forth, were added to this mixture. This material was blended and ground to a fineness which would pass a 35 mesh screen. The material was first preheated and then fed into a furnace where it was heated to 2,000 degrees F. in a reducing atmosphere of carbon monoxide obtained by reacting the carbon and metallic oxides. The material was held at this temperature for 35 minutes. It was then removed from the furnace and cooled in a non-oxidizing atmosphere. The following results were obtained: 97.85% of the zinc was recovered as metal, all of the iron was reduced to a magnetic state and 99% of this magnetic iron was magnetically recovered and the resultant magnetic product assayed 64.9% iron. At the same time, the bulk of the carbon particles were consumed leaving only a small amount of tailings to be disposed of.

The components used in this example were varied by changing the amount of coke fines from 78 to 228 parts with the result that the zinc recovery was increased to 98.77% and without any other significant change in the procedure. Further tests according to Example I were made using small and large amounts of ground coke and coal instead of coke fines. For all practical purposes, the results were consistent to the effect that 97 to 99% of the zinc was recovered, all of the iron was reduced to magnetic iron and 99% of this magnetic iron was recovered which assayed 63 to 65 percent iron. The smaller amounts of carbon particles were determined from the stoichiometric relationships of the components and the tests generally demonstrated that it was unnecessary to increase the carbon particles over this relationship in order to obtain better results.

Further tests according to the process set forth in Example I demonstrated that when the temperature of the furnace was less than 1900 degrees F., the percentage of zinc removal was substantially reduced and that the lower level of a permissible temperature drop should be not less than 1900 degrees F. for at this temperature, only 79.04% of the zinc was recovered. Theoretically, an operative temperature would be less than 1900 degrees F., but the tests indicated that the drop in efficiency would render a theoretical lower limit impractical. The process was found to work at higher temperatures; however, temperatures in excess of 2000 degrees F. did not improve the efficiency of the operation and a maximum temperature of 2200 degrees F. was the best obtainable without increasing the cost of processing excessively.

Further tests to determine the effect of time demonstrated that an extended heating time would increase the efficiency of zinc removal very slightly, but would decrease the quality of the iron recovered. Removing the material as soon as it reached the heat of 2000 degrees F. reduced the zinc removal slightly, from approximately 98% to 95%, but did not appreciably affect the percentage or quality of iron recovered. It was established that the time interval the components should be held in the furnace at the selected temperature should be between a momentary period and a time period of not more than one hour.

Further tests were conducted to determine the effect of pelletizing the blend and to determine the effect of varying the depth in which the blend was carried in the furnace. These tests indicated that considerable variations, using ground flue dust or using pelletized flue dust and in either a shallow bed or a deep bed, were possible without significant changes in the zinc recovery and in the amount of iron converted to magnetic iron.

It was found that the sulphur content in the magnetic iron product was 0.4%, but that when coal was used instead of coke fines, that this sulphur content could be increased to 1.09%. The process was again repeated a number of times with limestone particles being added. The sulphur content was thereby reduced to values varying between 0.03% to 0.20%.

The magnetic iron from the process, consisting of iron and lower oxides of iron ($FeO+Fe_3O_4$) were found to be suitable for forming into briquettes of high strength without the use of binders and when so formed into briquettes, the iron can be returned to the main blast furnace or basic oxygen furnace.

It was further found that by grinding the cooled, reduced iron prior to magnetic separation, for example to minus 200 mesh, the iron content of the magnetic product increased to 70 to 75% with the same 99% recovery.

I have now described my process in considerable detail. However, it is obvious that others skilled in the art can devise alternate and equivalent operations and procedures which are nevertheless within the spirit and scope of my invention.

I claim:

1. A method for the treatment of dust particles, such as flue dusts from iron making furnaces, which include essentially non-magnetic oxides of iron as a major constituent and compounds of zinc as a minor constituent and comprising the following steps:
    (a) moving the dust particles into and from a reaction zone in a substantially continuous flow;
    (b) creating an essentially oxygen-free-reducing atmosphere in the reaction zone and maintaining a heated temperature within the reaction zone in the range of from 1900° F. to 2200° F.;
    (c) moving the dust particles within the reaction zone at a rate which requires an exposure of the dust particles to the heated reducing atmosphere for a time period less than approximately one hour and sufficient to reduce the zinc compounds to metallic zinc in a vaporous state, and effect a reduction of a portion of the aforesaid non-magnetic particles of iron oxides to magnetic-responsive particles of iron and iron oxides; and
    (d) continuously removing portions of the aforesaid oxygen-free-reducing atmosphere from the reaction zone to a collection zone and cooling the atmosphere in the collection zone to a temperature of less than 700° F., whereby to condense zinc vapors and collect the zinc.

2. The method defined in claim 1, wherein:
    the continuous removal of portions of the aforesaid oxygen-free-reducing atmosphere from the reaction zone is effected by continuously circulating a portion of the atmosphere in the reaction zone by directing the same to a condensing zone;
    cooling the circulating atmosphere at the condensing zone to a temperature of less than 700° F. to condense zinc vapors to recover the same as metallic zinc; and thereafter returning the circulating atmosphere to the reaction zone.

3. In the method defined in claim 1, the further step of:
    holding the dust particles discharged from the reaction zone in an oxygen-free atmosphere until they are cooled to a temperature of less than 700° F. before releasing the same to normal atmosphere, whereby to prevent reoxidation of the reduced iron.

4. In the method defined in claim 2, including the step of:
    reheating the circulating atmosphere after it is cooled and stripped of the zinc and before it is returned to the reaction zone.

5. In the method defined in claim 1, wherein:
    the dust particles are preheated to a temperautre approaching 1700° F. before moving into the reaction zone.

6. In the method defined in claim 5, wherein:
    the preheating step is effected by moving, in countercurrent flow, a portion of said reducing atmosphere from the reaction zone and through dust particles as they move towards the reaction zone, with the dust particles being heated to approximately 1700° F. prior to entering the reaction zone and with the reducing atmosphere being cooled to a temperature below 700° F. before it leaves the particles to condense the zinc vapors upon particles of dust and thereby return the zinc to the reaction zone.

7. In the method defined in claim 5, including the step of:
    admitting sufficient oxygen to the reducing atmosphere when it is preheating the particles, to burn the same and to produce combustion of the gases in the reducing atmosphere.

8. In the method defined in claim 1, wherein small amounts of sulphur are to be found in the reaction zone and including the step of:
    adding lime particles to the dust to neutralize the sulphur.

9. In the method defined in claim 1, including the further steps of:

(a) removing the dust from the reaction zone after vaporization of the zinc and reduction of the aforesaid portion of the iron particles;

(b) cooling the removed dust in an oxygen-free atmosphere to a temperature below 700 degrees F., whereby to prevent reoxidation of the reduced iron; and (c) separating the magnetic responsive iron particles in the dust from non-magnetic responsive particles.

10. In the method defined in claim 1, wherein said dust includes:

an excess of carbon particles; and introducing sufficient oxygen into the reaction zone to burn a substantial portion, but not all, of the carbon particles to create an essentially oxygen free reducing atmosphere of carbon monoxide and at the same time generate heat within the reaction zone.

References Cited

UNITED STATES PATENTS

| | | | |
|---|---|---|---|
| 2,331,988 | 10/1943 | Loevenstein | 266—16 |
| 2,263,751 | 11/1941 | Avery | 75—88 |
| 3,437,331 | 4/1969 | Handwerk | 75—88 |
| 3,271,134 | 9/1966 | Derham | 75—88 |
| 3,262,771 | 7/1966 | Ban | 75—88 |
| 2,342,368 | 2/1944 | Queneau | 75—86 |
| 3,123,465 | 3/1964 | Sunday | 75—25 |

FOREIGN PATENTS

| | | | |
|---|---|---|---|
| 480,566 | 2/1938 | Great Britain | 75—25 |

L. DEWAYNE RUTLEDGE, Primary Examiner

P. D. ROSENBERG, Assistant Examiner

U.S. Cl. X.R.

75—77, 88